United States Patent [19]
Farrington et al.

[11] Patent Number: 5,870,291
[45] Date of Patent: Feb. 9, 1999

[54] ASYMMETRICAL HALF-BRIDGE CONVERTER HAVING ADJUSTABLE PARASITIC RESISTANCES TO OFFSET OUTPUT VOLTAGE DC BIAS

[75] Inventors: Richard W. Farrington, Heath; Mark E. Jacobs, Dallas; Rui Liu, Plano, all of Tex.

[73] Assignee: Lucent Technologies Inc., Murray Hill, N.J.

[21] Appl. No.: 936,986

[22] Filed: Sep. 25, 1997

[51] Int. Cl.[6] .................................................. H02M 3/335
[52] U.S. Cl. .................. 363/17; 363/98; 363/140
[58] Field of Search ................. 363/17, 98, 132, 363/140

[56] References Cited

U.S. PATENT DOCUMENTS

| | | | |
|---|---|---|---|
| 4,864,479 | 9/1989 | Steigerwald et al. | 363/17 |
| 5,132,889 | 7/1992 | Hitchcock et al. | 363/17 |
| 5,159,541 | 10/1992 | Jain | 363/26 |
| 5,245,520 | 9/1993 | Imbertson | 363/17 |
| 5,663,873 | 9/1997 | Bhagwat et al. | 363/20 |

OTHER PUBLICATIONS

T. Ninomiya, N. Matsumoto, T. Higashi, "Static and Dynamic Analysis of ZVS–PWM Half Bridge Converter", IEEE of Japan, Mag–90–82 (Technical Meeting on Magnetics) Mag–90–82 (in Japanese): Aug. 1990.
T. Ninomiya, N. Matsumoto, M. Nakahara, "Static and Dynamic Analysis of Zero–Voltage Switched Half–Bridge Converter with PWM Control", 1991 IEEE, pp. 230–237.
Paul Imbertson and Ned Mohan, "Asymmetrical Duty Cycle Permits Zero Switching Loss In PWM Circuits with No Conduction Loss Penalty", IEEE Transactions on Industry Applications, vol. 29, No. 1, Jan./Feb. 1993, pp. 121–125.
C. Peng, M. Hannigan, O. Seiersen, "A New Efficient High Frequency Rectifier Circuit", HFPC Jun. 1991 Proceedings, pp. 236–243.
Ionel Dan Jitaru, "Zero Voltage PWM, Double Ended Converter", HFPC May 1992 Proceedings, pp. 394–405.
Laszlo Huber and Milan M. Jovanovic, "Forward Converter with Current–Doubler Rectifier: Analysis, Design, and Evaluation Results", 1997 IEEE, pp. 605–611.
Norbert Frohleke, Alfred Fiedler, Horst Grotstollen, "Investigation of PWM Controlled, Resonant Transition Converters with Asymmetrical Duty Cycle", 1995 IEEE, pp. 429–433.
Ninomiya, er al "Static and Dynamic Characteristics of Zero–Voltage–Switched Half–Bridge Converter with PWM Control"IEICE Transactions; Dec. 1991; pp. 4085–4095, vol. E 74 No. 12.

*Primary Examiner*—Shawn Riley

[57] ABSTRACT

An asymmetrical half-bridge converter, a method of operating the same and a power supply that incorporates either the converter or the method. In one embodiment, the converter includes: (1) a power transformer that receives asymmetrical AC input power into a primary winding thereof via an input capacitor, the asymmetrical AC input power inducing a DC bias current in a secondary winding of the power transformer and (2) first and second serially-coupled output inductors coupled across the secondary winding and having parasitic resistances associated therewith that are independently selectable to attenuate the DC bias circuit in the secondary winding.

27 Claims, 7 Drawing Sheets

5,870,291

ASYMMETRICAL HALF-BRIDGE CONVERTER HAVING ADJUSTABLE PARASITIC RESISTANCES TO OFFSET OUTPUT VOLTAGE DC BIAS

TECHNICAL FIELD OF THE INVENTION

The present invention is directed, in general, to power conversion and, more particularly, to an asymmetrical half-bridge converter that is capable of achieving zero-voltage switching, a method of operating such converter and a power supply employing the converter.

BACKGROUND OF THE INVENTION

A power converter is a power processing circuit that converts an input voltage or current source waveform into a specified output voltage or current waveform. In a switch-mode converter, a pulse-width-modulation (PWM) controller is often used to control the on and off periods of switches employed therein. The controllable switches, in the switch-mode converter, are each required to conduct the substantial load dependent currents during the respective switching cycles. As a result, the switches are subjected to high switching stresses and high switching power losses that increase linearly with the switching frequency of the converter, thereby limiting the switches' usefulness at high frequencies. It is well known that, to increase the power density of the switch-mode converters and to reduce converter size and weight, the switching frequency may be increased. To realize the higher frequencies, the limitations associated with higher frequencies described above must be addressed. These limitations can be reduced if each switch in the converter changes its state (from on to off or vice versa) when the voltage across the switch or the current through the switch is zero at the switching instant. Converter topologies that reduce switching losses by turning the switches on or off when the current or voltage is zero are described as zero-current switching (ZCS) converters or zero-voltage switching (ZVS) converters, respectively.

An analysis of a ZVS half-bridge converter with PWM control is described, for example, in a paper entitled "Static and Dynamic Analysis of Zero-Voltage-Switched Half-Bridge Converter with PWM Control" by Tamotsu Ninomiya, et al., Proceedings of IEEE PESC '91, pp. 230–237 (1992); see also "Static and Dynamic Analysis of ZVS-PWM Half Bridge Converter" by T. Ninomiya, et al., IEE of Japan, MAG-90-82, August 1990, both of which are incorporated herein by reference. Ninomiya, et al., analyzed a half-bridge converter with an asymmetrical PWM control scheme and demonstrated quantitatively the improvement of the control characteristics performed by the asymmetrical regulation of a pair of switches employed therein.

Asymmetrical switching occurs when the two switches in a half-bridge converter are turned on and off complementarily. In the conventional switch-mode half-bridge converters, the power switches are typically maintained in a conducting state for an equal duration during each half of the switching period. For one duty cycle, alternately one switch, then the other switch, conducts during successive half periods of the duty cycle for the same length of time with a corresponding dead time between each conduction time period. Asymmetrical half-bridge converters differ from the conventional switch-mode half-bridge converters in that the switches conduct for unequal lengths of time with only a small deadtime between the alternating conduction periods.

A half-bridge converter employing an asymmetrical duty cycle to control the converter's switches is described in, for example, U.S. Pat. No. 5,245,520, issued on Oct. 10, 1993, to Imbertson, entitled "Asymmetrical Duty Cycle Power Converter," which is incorporated herein by reference. Imbertson describes using the small deadtime between conducting periods in an asymmetrical converter circuit to obtain low loss commutation of the power switches and using the variable conduction periods to regulate the output. Not only does the asymmetrical half-bridge converter provide ZVS capability, but due to the reduced voltage or current stresses on the switches the converter is suitable for high frequency applications.

An asymmetrical half-bridge converter, however, may suffer from having a DC bias current in the converter's power transformer and possibly a large ripple current component in the output of the converter when required to operate over a range of input voltages. The output ripple current can be reduced or eliminated by the design of the magnetics, however, at the expense of increasing the DC bias current in the converter's transformer. The DC bias current often necessitates that the magnetic core of the power transformer be increased to prevent the transformer from saturating. Therefore, care must be taken when determining the size of the transformer to take into account the largest DC bias current that may be present. This inevitably results in an increase in the overall size, weight and cost of the converter.

Accordingly, what is needed in the art is an improved converter that mitigates the above-identified problems and, more particularly, there is a need for an improved converter with a reduced or substantially zero DC bias current in the power transformer of the converter.

SUMMARY OF THE INVENTION

To address the above-discussed deficiencies of the prior art, the present invention provides an asymmetrical half-bridge converter, a method of operating the same and a power supply that incorporates either the converter or the method. In one embodiment, the converter includes: (1) a power transformer that receives asymmetrical AC input power into a primary winding thereof via an input capacitor, the asymmetrical AC input power inducing a DC bias current in a secondary winding of the power transformer and (2) first and second serially-coupled output inductors coupled across the secondary winding and having parasitic resistances associated therewith that are independently selectable to attenuate the DC bias circuit in the secondary winding. In a related, but alternative embodiment, the converter includes an external resistance coupled in series with the first and second serially-coupled output inductors.

The present invention therefore introduces an improved converter topology that features a reduced or substantially zero DC bias current in the converter's power (or isolation) transformer, thereby allowing the transformer's magnetic capacity to be utilized significantly more efficiently.

In one embodiment of the present invention, the converter further includes first and second serially-coupled switches, coupled across an input power source, that alternately conduct to provide the asymmetrical AC input power. In an embodiment to be illustrated and described, the first and second switches are controllable metal-oxide semiconductor field-effect transistors (MOSFETs). Those skilled in the art will understand, however, that the present invention is not limited to a particular front-end switching topology or to particular switching devices.

In one embodiment of the present invention, the primary winding has a first tap coupled via a commutating inductor to a node between the first and second switches and a second tap coupled to the input power source. The commutating inductor, while not necessary to the present invention, provides energy storage to assist the switching devices.

In one embodiment of the present invention, the converter further includes an output capacitor coupled to a node between the first and second output inductors. Likewise, those skilled in the art are familiar with output capacitors and their use in converters.

In one embodiment of the present invention, the converter further includes a blocking capacitor coupled between the first output inductor and the secondary winding. The use of a blocking capacitor to substantially eliminate the DC bias current cannot be employed in prior art converters, because the secondary windings of the transformer in the prior art converter has an inherent DC bias current that cannot be blocked without seriously affecting the proper operation of the converter.

In one embodiment of the present invention, the converter further includes first and second rectifying diodes having inputs coupled to the secondary winding, an output of the converter derived from outputs of the first and second rectifying diodes and a node between the first and second output inductors. Of course, any rectifying device, coupled between the power transformer and output of the converter, is well within the broad scope of the present invention.

In one embodiment of the present invention, the first and second output inductors share a common core (therefore being so-called "single-core inductors"). In one embodiment to be illustrated and described, the coupling coefficient between the first and second output inductors is less than 100%.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
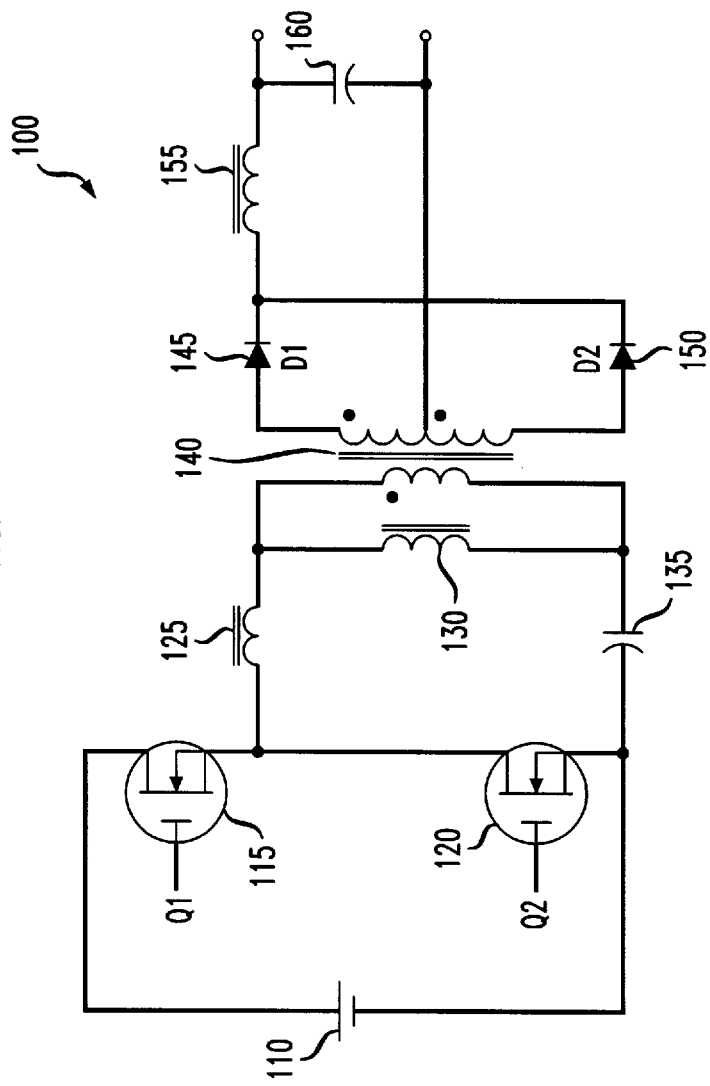
FIG. 1 illustrates a schematic diagram of a prior art asymmetrical half-bridge converter.

Referring initially to FIG. 1, illustrated is a schematic diagram of a prior art asymmetrical half-bridge converter 100. The asymmetrical half-bridge converter 100 includes an input power source 110 that is coupled to a first and a second switch 115, 120 (also referenced Q1, Q2, respectively). A commutating inductor 125 is coupled to both the first and second switches 115, 120 and to a first inductor 130. The first inductor 130 is also coupled in parallel to the primary windings of a power transformer 140 and in series with an input capacitor 135. Also shown is a first rectifying diode 145 (also referenced D1) and a second rectifying diode 150 (also referenced D2) that are coupled to the secondary windings of the power transformer 140. The first and second rectifying diodes 145, 150 are also coupled to an output filter inductor 155 that is coupled to an output capacitor 160.

The first and second switches 115, 120 (e.g., transistors) are operated with an asymmetrical duty cycle [i.e., the first switch 115 is conducting for a time period of D and the second switch 120 is conducting for a time period of (1-D) with a small deadtime between conducting periods]. The first and second switches 115, 120 convert the input power 110, typically a DC voltage, into a square wave AC voltage that can be transferred across the power transformer 140. The time period D, or duty cycle, controls the gain (i.e., $V_{out}/V_{in}$) of the asymmetrical half-bridge converter 100 allowing the output voltage $V_{out}$ to be kept constant when the input voltage $V_{in}$ changes.

The commutating inductor 125 including a leakage inductance of the power transformer 140 and any additional inductances placed in series with the primary winding of the power transformer 140 provides the energy required to charge and discharge the parasitic capacitances of the first and second switches 115, 120. The parasitic capacitances of the first and second switches 115, 120 and the commutating inductor 125 form a LC resonant tank circuit allowing the first and second switches 115, 120 to switch ON in a lossless manner. The first inductor 130 includes the magnetizing inductance of the power transformer 140 and any additional inductances placed in parallel with the primary winding of the power transformer 140. A current through the first inductor 130 diverts bridge current from reaching a load when the first switch 115 is conducting and adds to the bridge current delivered to the load when the second switch 120 is conducting thereby ensuring that the same current is delivered to the load during the conduction period of the first and second switches 115, 120.

The power transformer 140 transfers electrical energy from the input bridge (i.e., the first and second switches 115, 120) to the output rectifying and filtering circuit. The first and second rectifying diodes 145, 150 rectify the AC output of the power transformer 140 and pass the unidirectional but not "pure" DC voltage to a low pass output filter (e.g., the output filter inductor 155 and the output capacitor 160). The low pass filter smooths and filters the rectified square-edged pulses to produce a substantially pure DC output voltage.

The prior art asymmetrical half-bridge converter 100 exhibits the desirable features of other converter topologies, such as low conduction losses and zero-voltage switching. The asymmetrical duty cycles of the first and second switches 115, 120 introduce, however, a DC bias current in the secondary windings of the power transformer 140, because of the unequal conducting periods of the switches. The existence of the DC bias current requires a larger magnetic core in the power transformer 140 to compensate for the DC bias component to avoid saturation, thus preventing efficient utilization of the transformer's magnetic capacity.

Figure 2:
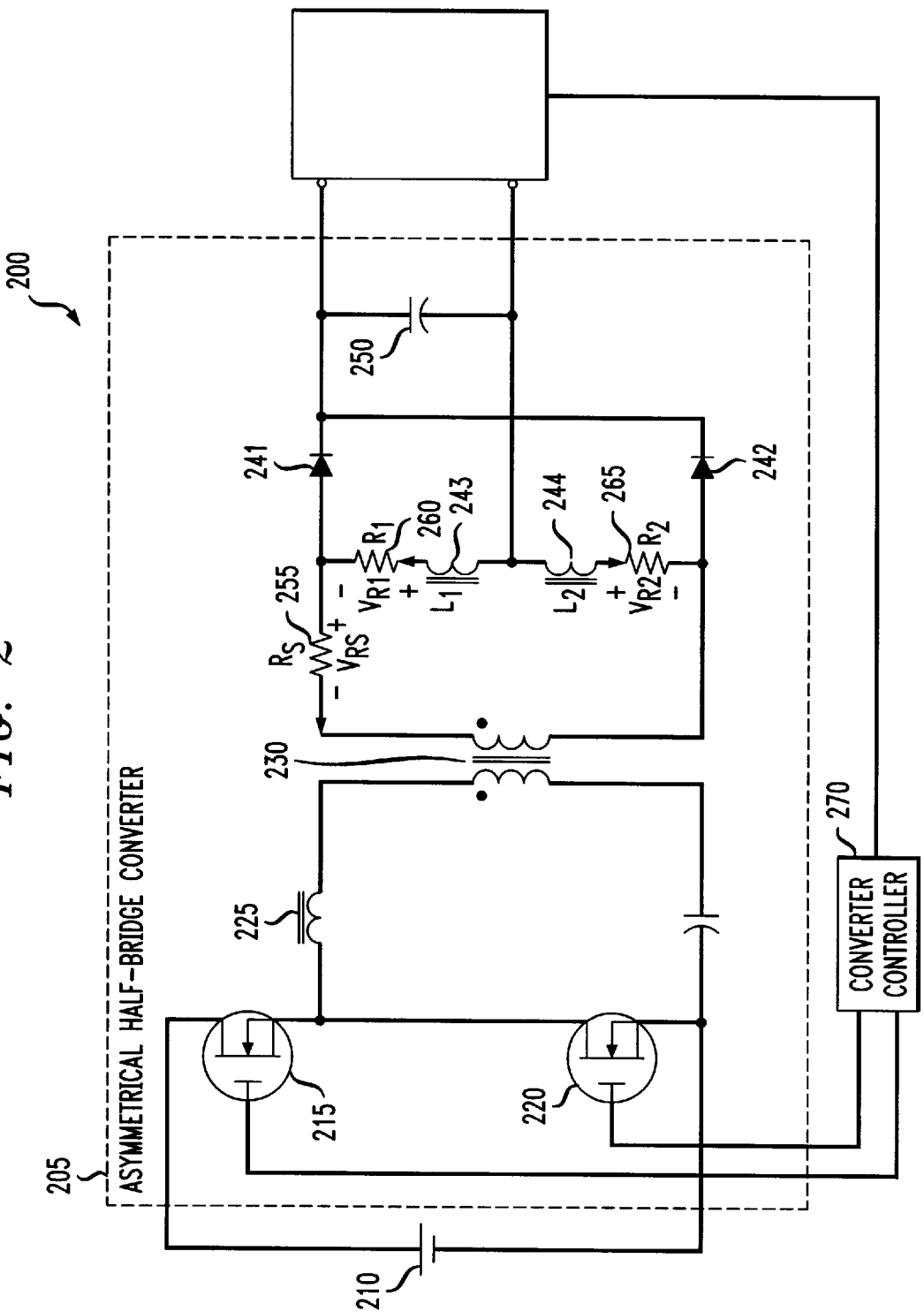
FIG. 2 illustrates a schematic diagram of a power supply employing an embodiment of an asymmetrical half-bridge converter constructed according to the principles of the present invention.
Figure 3A:
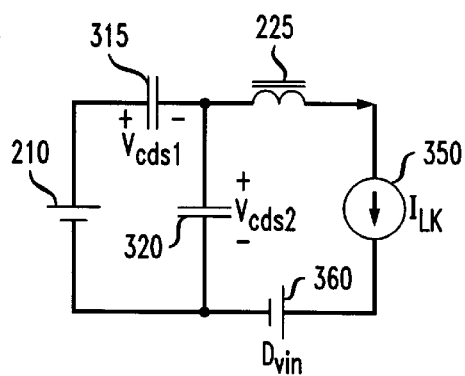
FIGS. 3A, 3B, 3C and 3D illustrate exemplary topological circuit mode representations of the asymmetrical half-bridge converter of FIG. 2 over a half switching cycle.
Figure 3B:
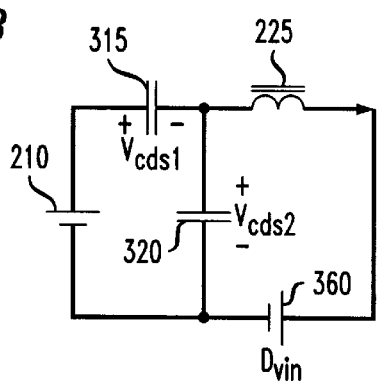
Figure 3C:
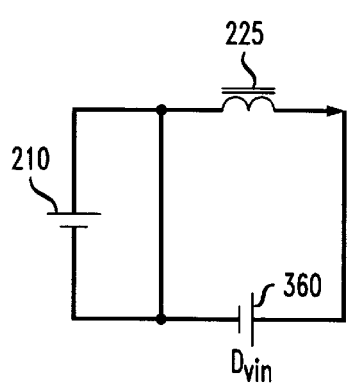
Figure 3D:
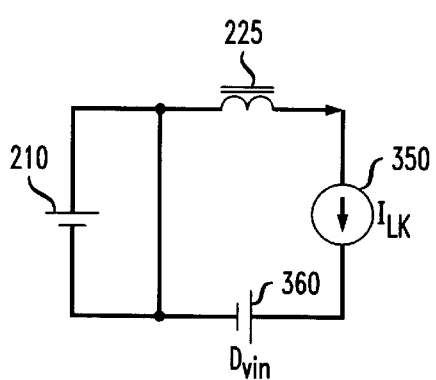

Turning now to FIG. 2, illustrated is a schematic diagram of a power supply 200 employing an embodiment of an asymmetrical half-bridge converter 205 constructed according to the principles of the present invention. The power supply 200 includes a power train (including the asymmetrical half-bridge converter 205) that receives power from a DC input power source 210 and converts the input power to provide output power to an electrical load 260. The power supply 200 also includes a converter controller 270. The input power source 210 is coupled to the asymmetrical half-bridge converter 205 and, more particularly, to first and second switches 215, 220 and to a second tap (shown, but not referenced) of the primary winding of a power transformer 230. A commutating inductor 225 is coupled to both the first and second switches 215, 220 and to a first tap (shown, but not referenced) of the primary winding of the power transformer 230. The commutating inductor 225 may consist solely of the leakage inductance of the power transformer 230. The present invention, however, does not limit the commutating inductor 225 to consist only of the leakage inductance of the power transformer, but may also include external inductances. An input capacitor 235 is coupled to the primary winding of the power transformer 230 and to the second switch 220.

Also shown is a current-doubling output rectifying circuit that is coupled to the secondary winding of the power transformer 230. The current-doubling output rectifying circuit is also coupled to an output capacitor 250 and includes a first and a second output inductors 243, 244. The output capacitor 250 is coupled to the electrical load 260 that is coupled to the converter controller 270. The converter controller 270 applies a pulse width modulation (PWM) switching pattern having an asymmetrical duty cycle to control the first and second switches 215, 220. The first and second output inductors 243, 244 are coupled to first and a second rectifying diodes 241, 242, respectively. The current-doubling output rectifying circuit replaces the center-tapped rectifying circuit employed in the asymmetrical half-bridge converter 100 of FIG. 1. The use of the current-doubling output rectifying circuit allows the use of one secondary winding, as opposed to two secondary windings typically employed in a conventional asymmetrical half-bridge converter.

Additionally, a parasitic resistance 260 (also referenced $R_1$) of the first output inductor 243 is coupled between the first output inductor 243 and the first rectifying diode 241. A parasitic resistance 265 (also referenced as $R_2$) of the second output inductor 244 is coupled between the second output inductor 244 and the second rectifying diode 242. A parasitic resistance 255 (also referenced as $R_s$) of the secondary winding of the power transformer 230 is coupled between the power transformer 230 and the first rectifying diode 241.

Turning now to FIGS. 3A, 3B, 3C, and 3D, illustrated are exemplary topological circuit mode representations of the asymmetrical half-bridge converter 205 of FIG. 2 over a half switching cycle. The topological circuit mode representations include the input power source 210 that is coupled to a first capacitance 315. The first capacitance 315 is coupled to a second capacitance 320 and the commutating inductor 225. Also included is a second voltage source 360 (also referenced $D_{vin}$) coupled to the second capacitance 320 and the commutating inductor 225. An inductor current 350 (also referenced $I_{LK}$) is also shown flowing between the commutating inductor 225 and a second voltage source 360.

The first and second capacitances 315, 320 are the parasitic capacitances of the first and second switches 215, 220, respectively. Assuming that the capacitance of the input capacitor 235 is sufficiently large to be considered a DC voltage source over a switching cycle, the second voltage source 360 represents the input capacitor 235.

With continuing reference to FIG. 2, the operation of the asymmetrical half-bridge converter 205 is hereinafter described. For steady-state analysis of the asymmetrical half-bridge converter 205, it is assumed that the output inductor is sufficiently large such that the current therethrough can be considered a constant value. Initially, before the beginning of a first mode (termed "Mode 1" and illustrated in FIG. 3A), the first switch 215 is ON (i.e., conducting) and the second switch 220 is OFF. On the output side of the asymmetrical half-bridge converter 205, the first rectifying diode 241 is forward biased and conducting while the second rectifying diode 242 is reverse-biased. The inductor current 350 is given by:

$$I_{Lk} = \frac{I_{L2} \cdot N_s}{N_p} \qquad (1)$$

At time $t=t_0$, the first switch 215 is turned OFF and the first capacitance 315 is charged by the inductor current 350. At the same time, the second capacitance 320 discharges until the value of the voltage across the second capacitance 320 is equal to the second voltage source 360 at time $t=t_1$.

$$V_{cds2} = D \cdot V_{in} \qquad (2)$$

Also, during Mode 1, the energy stored in the magnetizing inductance of the second output inductor 244 is used to charge and discharge the first and second capacitances 315, 320.

During the time period from $t_1=t_2$, a second mode (termed "Mode 2" and illustrated in FIG. 3B) occurs. The first and second capacitances 315, 320 are repeatedly charged and discharged, resonantly, by the energy stored in the magnetizing inductance of the commutating inductor 225. Full zero-voltage switching can be obtained if the energy stored in the commutating inductor 225 is sufficiently large, otherwise, only partial zero-voltage switching may be obtained.

Mode 2 ends and a third mode begins at time $t=t_2$ (termed "Mode 3" and illustrated in FIG. 3C) when the second capacitance 320 is discharged to zero (i.e., $V_{cds2}=0$) as a result of the zero-voltage switching or when the second switch 220 is turned ON. During Mode 3, from time $t=t_2$ to $t=t_3$, the inductor current 350 decreases to:

$$I_{Lk} = \frac{I_{L1} \cdot N_s}{N_p} \qquad (3)$$

From time $t=t_3$ to $t=t_4$, a fourth mode (termed "Mode 4" and illustrated in FIG. 3D) occurs. The energy previously stored in the input capacitor 235 is transferred to the output until the second switch is turned OFF at $t=t_4$.

The second half of the switching cycle of the asymmetrical half-bridge converter 205 is similar to the first half described above. The voltage gain of the asymmetrical half-bridge converter 205 is given by:

$$\frac{V_{out}}{V_{in}} = \frac{N_s}{N_p} D(1-D) \qquad (4)$$

and the voltage $V_{ci}$ across the input capacitor 235 is given by:

$$V_{ci} = D \cdot V_{in} \qquad (5)$$

The steady-state equations for the asymmetrical half-bridge converter 100 and a asymmetrical half-bridge converter 205 constructed according to the principles of the present invention are summarized in Table I, below. The duty ratio lost by reason of the zero-voltage switching is not included in the analysis and the actual duty ratio should be slightly larger than that calculated. However, since the lost duty ratio is small compared to the normal duty ratio, the accuracy of the steady-state analysis is not significantly affected. For ease of comparison, the current and voltage stresses on switches and diodes are also set forth in Table I.

TABLE I

Steady-State Equations

| Component | Prior Art Converter | Converter of the Present Invention |
|---|---|---|
| Switch Q1 | $V_{ds1} = V_{in}$ | Same |
| | $I_{Q1rms} = \sqrt{D} \cdot I_{Q1p}$ | |
| | $I_{Q1p} = \frac{I_o \cdot N_s}{N_p} (1-D)$ | |
| Switch Q2 | $V_{ds2} = V_{in}$ | Same |
| | $I_{Q2rms} = \sqrt{1-D} \cdot I_{Q2p}$ | |
| | $I_{Q2p} = \frac{I_o \cdot N_s}{N_p} D$ | |
| Rectifier Diode D1 | $V_{d1} = \frac{N_s}{N_p} D \cdot V_{in}$ | Same |
| | $I_{d1ave} = I_o D$ | |
| Rectifier Diode D2 | $V_{d2} = \frac{N_s}{N_p} (1-D) V_{in}$ | Same |
| | $I_{d2ave} = I_o(1-D)$ | |
| Transformer | $I_{prms} = \sqrt{D \cdot I^2_{Q1p} + (1-D)I^2_{Q2p}}$ | $I_{prms} = \sqrt{D \cdot I^2_{Q1p} + (1-D)I^2_{Q2p}}$ |
| | $I_{s\_dc} = (1-2D) \cdot I_o$ | $I_{srms} = I_o \sqrt{D(1-D)}$ |
| | $I_{s2rms} = \sqrt{1-D} \cdot I_o$ | $I_{s\_dc} = I_{L1}(1-D) - I_{L2} \cdot D = 0$ |
| | $I_{s1rms} = \sqrt{D} \cdot I_o$ | |
| Inductor 1 | N/A | $I_{L1ave} = D \cdot I_o$ |
| Inductor 2 | N/A | $I_{L2ave} = (1-D)I_o$ |
| Output Inductor | $I_{Loave} = I_o$ | N/A |
| Output Capacitor Ripple Current | $\Delta I_{co} = \frac{D}{f_s} \cdot L_o \left[ V_{in}(1-D) \frac{N_{sl}}{N_p} - V_o \right]$ | $\Delta I_{co} = \frac{V_o}{f_s} \left( \frac{1-D}{L_2} - \frac{D}{L_1} \right)$ |
| | $\Delta I_{co\_rms} = \sqrt{\frac{\Delta I_{co}}{12}}$ | $\Delta I_{co\_rms} = \sqrt{\frac{\Delta I_{co}}{12}}$ |

The equations in Table I, along with equations (4) and (5), illustrate that the voltage gains for both converters are the same. Similarly, the voltage and current stresses on the switches and rectifying diodes are the same for both converter design topologies and the present invention also provides lossless switching and low conduction losses.

The asymmetrical half-bridge converter 205 has only one secondary winding in the power transformer 230; the root mean square (rms) current through the secondary winding during operation of the asymmetrical half-bridge converter 205 is significantly less than the rms current in any one of the secondary windings of the power transformer 140 of in the prior art converter 100 of FIG. 1. The differences in the rms current in the power transformers in the prior art converter 100 and the asymmetrical half-bridge converter 205 of the present invention may be explored further with reference to FIGS. 4A and 4B.

Figure 4A:
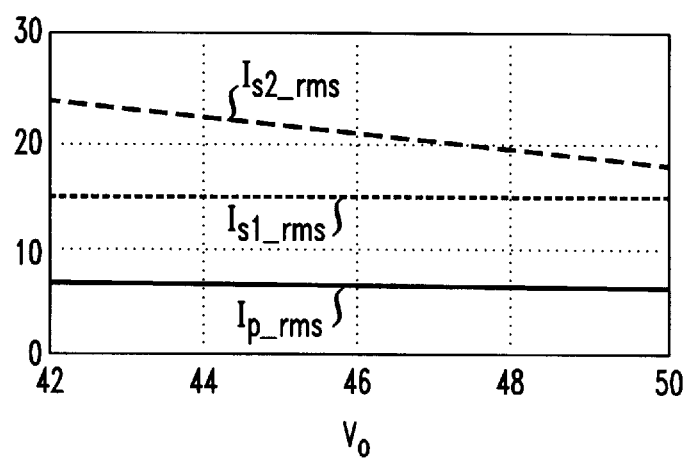
FIGS. 4A and 4B illustrate primary and secondary root mean square (rms) currents in the power transformers of the converter of FIG. 1 and the converter of FIG. 2, respectively.
Figure 4B:
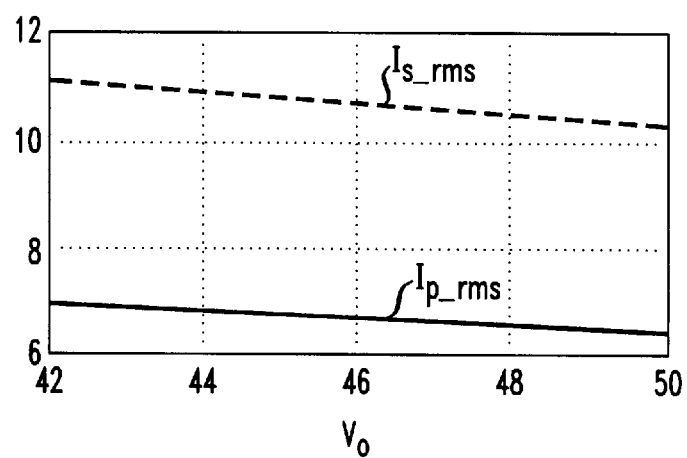

Turning now to FIGS. 4A and 4B, illustrated are primary and secondary rms currents in the power transformers 140, 230 of the converter 100 of FIG. 1 and the converter 205 of FIG. 2, respectively. The primary and secondary rms currents $I_{p\_rms}$, $I_{s\_rms}$ are illustrative of the converters 100, providing one kilowatt (kW) of constant output power with an output voltage range between 42 and 50 volts.

The significant reduction of the secondary rms current (clearly evident from a comparison of the secondary rms currents in FIGS. 4A and 4B) demonstrates that a smaller magnetic core can be used in the power transformer 230 of the topology of the present invention thereby substantially reducing the cost and weight of the asymmetrical half-bridge converter 205. Furthermore, with the reduction of the rms current through the secondary winding, magnet wire may often be used in the construction of both the transformer's primary and secondary windings, further simplifying the transformer 230 design.

Both converters, may have the output ripple current eliminated at a particular duty ratio and reduced over a given range of duty ratio. The output ripple current reduction or cancellation in the prior art converter 100, however, is obtained at the cost of increasing the DC bias current in the secondary winding of the power transformer 130. The reduction or cancellation of the output ripple current in the asymmetrical half-bridge converter 205 of the present invention, on the other hand, is not necessarily accompanied with a corresponding increase in the DC bias current in the power transformer 230. The procedure for reducing the output ripple current is as follows.

The total inductance of the first and second output inductors 243, 244 is first determined using the maximum allowable magnetizing ripple current at the maximum duty ratio:

$$L_1 + L_2 = \frac{N_s}{N_p} \frac{(1-D_{max})D_{max}V_\epsilon}{f_s I_{m\_max}} = \frac{V_o}{f_s I_{m\_max}} \quad (6)$$

where $I_{m\_max}$ is the maximum allowable peak-to-peak magnetizing ripple current and $L_1$ and $L_2$ represent the first and second output inductors 243, 244, respectively. The ratio of $L_1/L_2$ is then determined using:

$$\frac{L_1}{L_2} = \frac{D_{max}}{1-D_{max}} \quad (7)$$

Using equations (6) and (7) results in the cancellation of the output ripple current when $D=D_{max}$ and output ripple current reduction when $D<D_{max}$.

The cancellation of the output ripple current is not necessarily confined to occur only at $D_{max}$. The cancellation of the output ripple current may be realized at any duty ratio between $D_{min}$ and $D_{max}$ using equation (7). The peak current-mode control loop must, however, be able to manage the polarity change in the output ripple current "slope" when D changes, because of line or load regulations.

As previously mentioned, the asymmetrical half-bridge converter 205 of the present invention concurrently reduces the DC bias current in the secondary winding of the power transformer 230. If the net sum of the DC voltages $V_{R1}$, $V_{R2}$ across the parasitic resistances 260, 265 of the first and second output inductors 243, 244, respectively, is not equal to zero, a DC voltage is applied to the secondary side of the power transformer 230. To offset the DC voltage applied across the secondary winding of the power transformer 230, a DC bias current is generated to flow through the secondary winding of the power transformer 230 producing an offset voltage $V_{RS}$ across the secondary winding parasitic resistance 255. Using Kirchoff's loop equation, the following relationship results:

$$V_{Rs} = V_{R2} - V_{R1} \quad (8)$$

Equation (8) reveals that the DC current distribution between the power transformer 230 and the first and second output inductors 243, 244 is determined by the DC voltage balance described in equation (8). The relationships between the parasitic resistances $R_1$, $R_2$, $R_s$ and the currents $I_S$, $I_{L1}$, $I_{L2}$ through the secondary winding of the power transformer 230 and the first and second output inductors 243, 244, respectively, are as follows:

$$\overline{I_{L1}} = \frac{\frac{R_2}{R_s} + D}{1 + \frac{R_1+R_2}{R_s}} I_o \quad (9)$$

$$\overline{I_{L2}} = \frac{\frac{R_1}{R_s} + (1-D)}{1 + \frac{R_1+R_2}{R_s}} I_o \quad (10)$$

$$\overline{I_s} = \frac{\frac{R_2}{R_s} - \frac{R_1+R_2}{R_s}D}{1 + \frac{R_1+R_2}{R_s}} I_o \quad (11)$$

where $\overline{I}_{L1}$, $\overline{I}_{L2}$ and $\overline{I}_s$ are the average currents of $I_{L1}$, $I_{L2}$ and $I_s$, respectively, and $R_1$ and $R_2$ are the parasitic resistances of L1 and L2, respectively, and further include any additional external resistance that may be added (to one or both) to supplement the parasitic resistances $R_1$ and $R_2$.

Equations (9) through (11) demonstrate that the DC bias current may be substantially reduced by selecting the parasitic resistances accordingly. To reduce the DC bias current to zero for a particular duty ratio (D), for illustrative purposes, the parasitic resistances $R_1$, $R_2$ are selected to satisfy the following equation:

$$\frac{R_2}{R_1+R_2} = D \quad (12)$$

The above condition (DC current equal to zero) will not hold true if the duty ratio D changes, for example, because of input voltage or load variations. Recognizing that duty ratio D could change because of changing load or input voltage, the power transformer 230 should be designed to accommodate the largest possible DC bias current resulting from all possible operating conditions. Taking into account the parasitic resistance $R_s$ of the power transformer 230, the DC bias current can also be minimized, for example, by setting $R_1=R_2$ and $R_s=3R_1$, whereby equation (11) reduces to:

$$\overline{I_s} = \frac{(1-2D)I_o}{5} \quad (13)$$

It should be noted that the parasitic resistance $R_s$ includes both the parasitic resistance of the power transformer 230 and any additional external resistances that may be added to reduce the DC bias. Equation (13) illustrates that the DC bias current in the power transformer 230 of the asymmetrical half-bridge converter 205 of the present invention is one-fifth (20%) of the DC bias current in a prior art converter for all values of D. The differences in the amount of DC bias current present in a prior art converter and a converter of the present invention are exemplified in FIG. 5.

Figure 5:
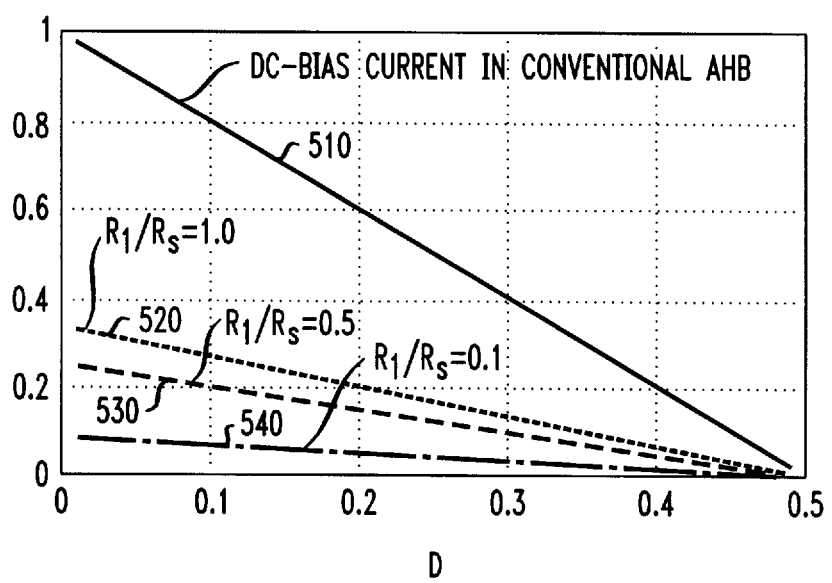
FIG. 5 illustrates the DC bias currents of the converter of FIG. 1 and the converter of FIG. 2 with exemplary parasitic resistances ratios and duty ratios.

Turning now to FIG. 5, illustrated are the DC bias currents of the prior art converter 100 of FIG. 1 (represented by waveform 510) and the converter 205 of FIG. 2 with exemplary parasitic resistances ratios and duty ratios (represented by waveforms 520, 530, 540). The smaller DC bias currents illustrate that the energy stored in the power transformer 230 of the asymmetrical half-bridge converter 205 is substantially reduced, provided that the magnetizing inductance is the same for both converters 100, 205. Since the power transformer 230 in the asymmetrical half-bridge converter 205 has to store a substantially smaller amount of energy, the magnetic core can be substantially reduced, resulting in a smaller and less costly transformer design.

Figure 6:
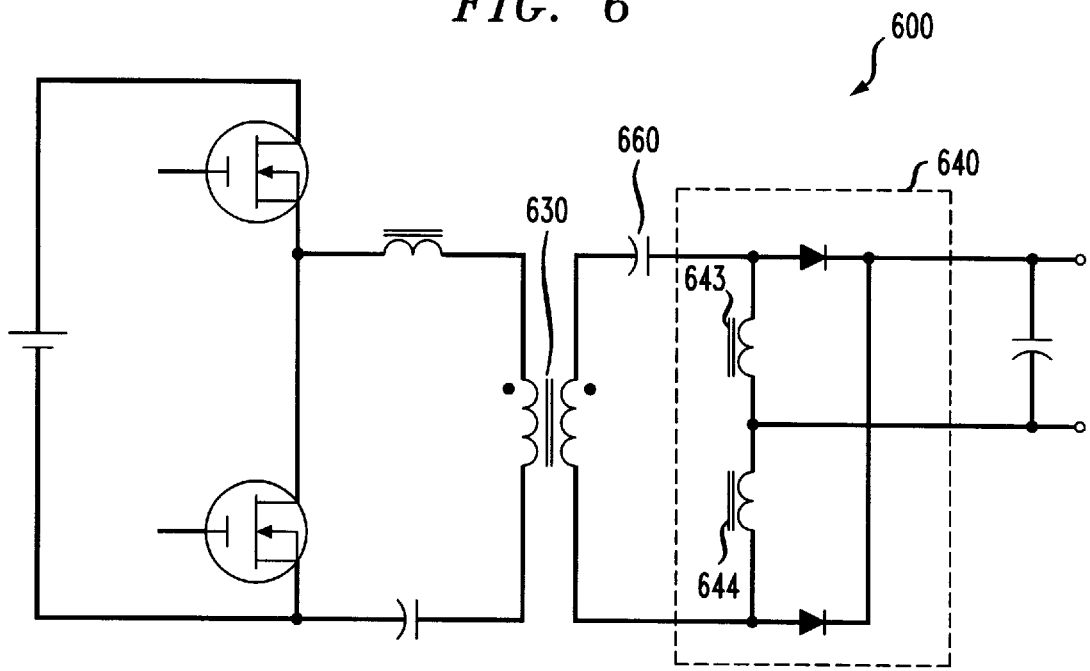
FIG. 6 illustrates a schematic diagram of another embodiment of an asymmetrical half-bridge converter constructed according to the principles of the present invention.

Turning now to FIG. 6, illustrated is a schematic diagram of another embodiment of an asymmetrical half-bridge converter 500 constructed according to the principles of the present invention. The asymmetrical half-bridge converter 600 is analogous to the asymmetrical half-bridge converter 205 illustrated in FIG. 2, except that a blocking capacitor 660 has been added to the secondary side of a power transformer 630 and the parasitic resistances of first and second output inductors 643, 644 are not shown or independently selected. The blocking capacitor 660 is coupled in series between the secondary winding of the power transformer 630 and a current-doubling rectifying circuit 640 to substantially eliminate the DC bias current in the power transformer 630.

The primary consideration in selecting the blocking capacitor 660 is that the capacitor has to be capable of handling a large rms ripple current. Since the DC voltage across the parasitic resistances is small, typically less than 1 volt, the voltage rating of the blocking capacitor 660 may be minimal (e.g., a polypropylene-type capacitor with a 25 VDC rating). The use of a blocking capacitor 660 to substantially eliminate the DC bias current cannot be employed in the prior art converter 100 of FIG. 1, because the secondary windings of the transformer 130 in the prior art converter 100 have an inherent DC bias current that cannot be blocked without seriously affecting the operation of the converter 100.

Figure 7A:
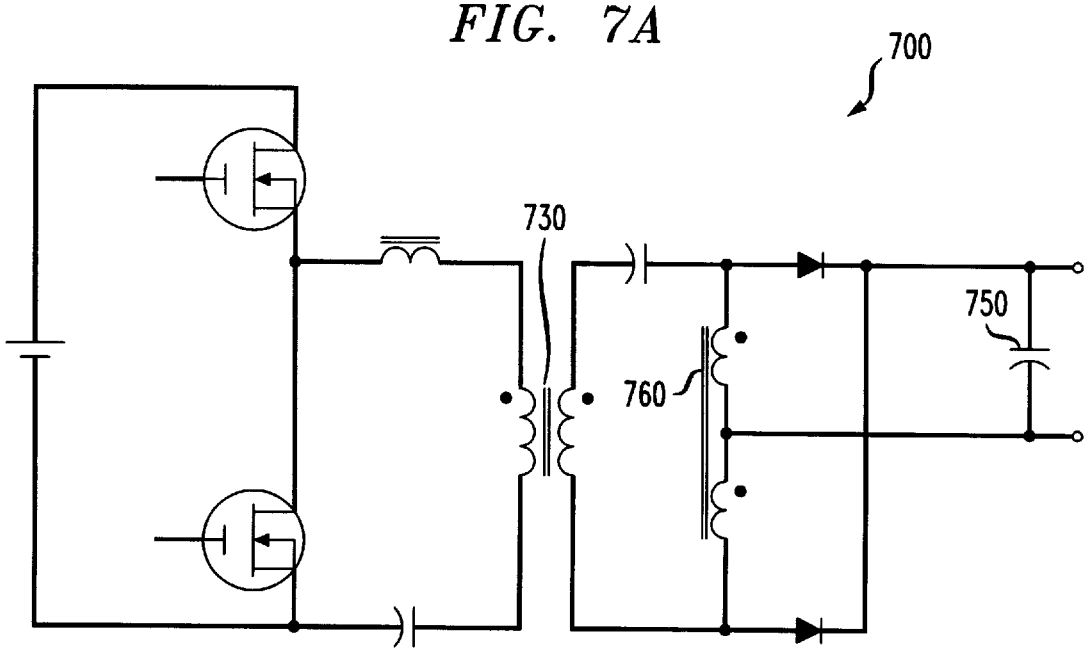
FIG. 7A illustrates a schematic diagram of another embodiment of an asymmetrical half-bridge converter constructed according to the principles of the present invention with a single-core output inductor.
Figure 7B:
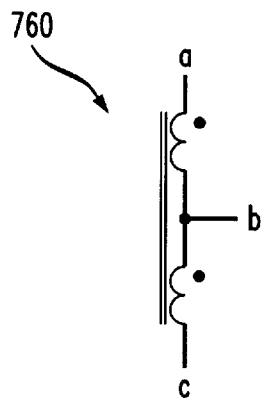
FIG. 7B illustrates a schematic diagram of the single-core output inductor of FIG. 7A.
Figure 7C:
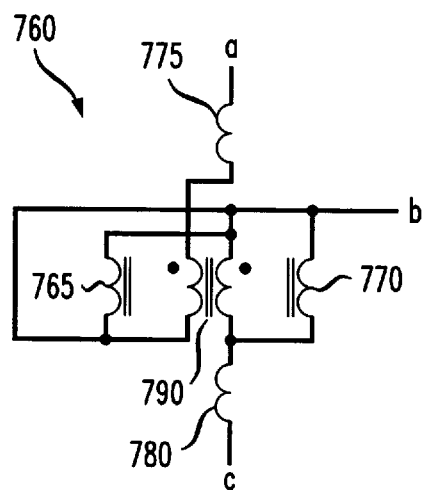
FIG. 7C illustrates an equivalent circuit diagram of the single-core output inductor of FIG. 7A.

Turning now to FIGS. 7A, 7B, and 7C, illustrated are a schematic diagrams of another embodiment of an asymmetrical half-bridge converter 800 constructed according to the principles of the present invention of the present invention with a single-core output inductor 760 and diagrams of the single-core output inductor 760, itself. The asymmetrical half-bridge converter 700 is analogous to the converter 600 of FIG. 6 with the first and second output inductors 643, 644 replaced with a single-core output inductor 760. The single-core output inductor 760 includes a first and second inductor 765, 770 that are coupled to a first and second leakage inductance 775, 780. Also shown is an ideal transformer 790 that is coupled to the first and second inductor 765, 770.

The first and second inductors 765, 770 may be wound on a single core provided that the coupling coefficient is less than 100%. A coupling coefficient of approximately 50% will result in the equivalent circuit illustrated in FIG. 7C. Similarly, a coupling coefficient equal to zero will result in the asymmetrical half-bridge converter 600 illustrated in FIG. 6. The first and second leakage inductances 775, 780 should be able withstand the voltage difference between the secondary voltage of a power transformer 730 and the voltage across an output capacitor 750 (i.e., output voltage). Additionally, the larger the values of the first and second leakage inductances 775, 780, the smaller the resulting magnetizing ripple current.

From the above, it is apparent that the present invention provides an asymmetrical half-bridge converter, a method of operating the same and a power supply that incorporates either the converter or the method. In one embodiment, the converter includes: (1) a power transformer that receives asymmetrical AC input power into a primary winding thereof via an input capacitor, the asymmetrical AC input power inducing a DC bias current in a secondary winding of the power transformer and (2) first and second serially-coupled output inductors coupled across the secondary winding and having parasitic resistances associated therewith that are independently selectable to attenuate the DC bias circuit in the secondary winding. It is further apparent that in an alternative embodiment of the present invention, the parasitic resistances of the inductors do not need to be independently selected and a blocking device such as a blocking capacitor may be employed to attenuate the DC bias circuit in the secondary winding.

Exemplary embodiments of the present invention have been illustrated above with reference to specific electronic and magnetic components. Those skilled in the art are aware, however, that components may be substituted (not necessarily with components of the same type) to create desired conditions or accomplish desired results. For instance, multiple components may be substituted for a single component and vice-versa. Similarly, although a magnetic device having a single core and a single primary winding has been illustrated, other configurations, such as magnetic devices having multiple primary windings or multiple cores, may be used to accomplish essentially the same results disclosed by the present invention.

Although the present invention has been described in detail, those skilled in the art should understand that they can make various changes, substitutions and alterations herein without departing from the spirit and scope of the invention in its broadest form.

What is claimed is:

1. An asymmetrical half-bridge converter, comprising:
   a power transformer that receives asymmetrical AC input power into a primary winding thereof via an input capacitor, said asymmetrical AC input power inducing a DC bias current in a secondary winding of said power transformer; and
   first and second serially-coupled output inductors coupled across said secondary winding and having parasitic resistances associated therewith that are independently selectable to attenuate said DC bias circuit in said secondary winding.

2. The converter as recited in claim 1 further comprising an external resistance coupled in series with said first and second serially-coupled output inductors.

3. The converter as recited in claim 1 further comprising first and second switches, coupled across an input power source, that alternately conduct to provide said asymmetrical AC input power.

4. The converter as recited in claim 3 wherein said primary winding has a first tap coupled via a commutating inductor to a node between said first and second switches and a second tap coupled to said input power source.

5. The converter as recited in claim 1 wherein said first and second serially-coupled output inductors and a duty ratio of said converter are substantially related to one another by:

$$\frac{L_1}{L_2} = \frac{D}{1-D}$$

where $L_1$ and $L_2$ are inductances of said first and second serially-coupled output inductors, respectively, and D is said duty ratio of said converter.

6. The converter as recited in claim 1 wherein said parasitic resistances are substantially related to one another by:

$$\frac{R_2}{R_1 + R_2} = D$$

where $R_1$ and $R_2$ include said parasitic resistances of said first and second serially-coupled output inductors, respectively, and D is a duty ratio of said converter.

7. The converter as recited in claim 1 further comprising an output capacitor coupled to a node between said first and second serially-coupled output inductors.

8. The converter as recited in claim 1 further comprising a blocking capacitor coupled between said first and second serially-coupled output inductors and said secondary winding.

9. The converter as recited in claim 1 further comprising first and second rectifying diodes having inputs coupled to said secondary winding, an output of said converter derived from outputs of said first and second rectifying diodes and a node between said first and second serially-coupled output inductors.

10. The converter as recited in claim 1 wherein said first and second serially-coupled output inductors share a common core.

11. A method of operating an asymmetrical half-bridge converter, comprising the steps of:
receiving an asymmetrical AC input power into a primary winding of a power transformer via an input capacitor, said asymmetrical AC input power inducing a DC bias current in a secondary winding of said power transformer;
processing power received from said secondary winding with first and second serially-coupled output inductors; and
attenuating said DC bias circuit in said secondary winding with independently selectable parasitic resistances associated with said first and second serially-coupled output inductors.

12. The method as recited in claim 11 further comprising the step of coupling an external resistance in series with said first and second serially-coupled output inductors.

13. The method as recited in claim 11 further comprising the step of providing said AC input power with first and second switches coupled across an input power source.

14. The method as recited in claim 13 wherein said primary winding has a first tap coupled via a commutating inductor to a node between said first and second switches and a second tap coupled to said input power source.

15. The converter as recited in claim 11 wherein said first and second serially-coupled output inductors and a duty ratio of said converter are substantially related to one another by:

$$\frac{L_1}{L_2} = \frac{D}{1-D}$$

where $L_1$ and $L_2$ are inductances of said first and second serially-coupled output inductors, respectively, and D is said duty ratio of said converter.

16. The converter as recited in claim 11 wherein said parasitic resistances are substantially related to one another by:

$$\frac{R_2}{R_1 + R_2} = D$$

where $R_1$ and $R_2$ include said parasitic resistances of said first and second serially-coupled output inductors, respectively, and D is a duty ratio of said converter.

17. The method as recited in claim 11 further comprising the step of processing said power with an output capacitor coupled to a node between said first and second serially-coupled output inductors.

18. The method as recited in claim 11 further comprising the step of processing said power with a blocking capacitor coupled between said first and second serially-coupled output inductors and said secondary winding.

19. The method as recited in claim 11 wherein said first and second serially-coupled output inductors share a common core.

20. The method as recited in claim 11 further comprising the steps of:
rectifying said power with first and second rectifying diodes having inputs coupled to said secondary winding; and
deriving an output of said converter from outputs of said first and second rectifying diodes and a node between said first and second serially-coupled output inductors.

21. A power supply, comprising:
a power train that receives AC input power from an input power source and converts said AC input power to provide output power to an electrical load, said power train containing an asymmetrical half-bridge converter, including:
first and second serially-coupled switches, coupled across said input power source, controllable to provide asymmetrical power,
a power transformer having a primary winding with a first tap coupled via a commutating inductor to a node between said first and second switches and a second tap coupled to said input power source via an input capacitor, said asymmetrical power inducing a DC bias current in a secondary winding of said power transformer,
first and second serially-coupled output inductors coupled to first and second taps of said secondary winding and having parasitic resistances associated therewith that are independently selectable to attenuate said DC bias circuit in said secondary winding, and
first and second rectifying diodes having inputs coupled to said first and second taps of said secondary winding, respectively, and outputs coupled to a first output rail of said converter, a node between said first and second serially-coupled output inductors coupled to a second output rail of said converter; and a converter controller, coupled to control inputs of said first and second switches, that applies a pulse width modulation (PWM) switching pattern having an asymmetrical duty cycle to said first and second switches.

22. The power supply as recited in claim 21 wherein said converter controller applies said PWM switching pattern to said first and second switches to cause said converter to operate in a zero-voltage switching mode.

23. The power supply as recited in claim 21 wherein said converter further comprises an output capacitor coupled between said outputs of said first and second rectifying diodes and said node between said first and second serially-coupled output inductors.

24. The power supply as recited in claim 21 wherein said converter further comprises a blocking capacitor coupled between said first and second serially-coupled output inductors and said power transformer.

25. The power supply as recited in claim 21 wherein said first and second serially-coupled output inductors share a common core.

26. The power supply as recited in claim 21 wherein said converter further comprises an external resistance coupled in series with said first and second serially-coupled output inductors.

27. The power supply as recited in claim 21 wherein said parasitic resistances are substantially related to one another by:

$$\frac{R_2}{R_1 + R_2} = D$$

where $R_1$ and $R_2$ include said parasitic resistances of said first and second serially-coupled output inductors, respectively, and D is a duty ratio of said converter.

* * * * *